United States Patent [19]
Rusnack

[11] Patent Number: 5,917,253
[45] Date of Patent: *Jun. 29, 1999

[54] LIVE AC MAINS POWER SELECTOR FOR REDUNDANT SYSTEMS

[75] Inventor: Michael R. Rusnack, Boise, Id.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,219

[22] Filed: Sep. 25, 1996

[51] Int. Cl.$^6$ ....................................................... H02J 9/06
[52] U.S. Cl. .............................. 307/64; 307/66; 307/29; 307/80; 361/187; 365/226; 365/229; 395/750.01
[58] Field of Search .................................. 307/18, 19, 23, 307/25, 38, 64, 65, 66, 43, 73, 80, 85, 86; 364/492, 273.4, 273.5, 948.5, 948.91; 361/187; 365/226, 227, 228, 229; 395/750.01; 340/333

[56] References Cited

U.S. PATENT DOCUMENTS

| | | |
|---|---|---|
| 3,818,237 | 6/1974 | Straw ........................................ 307/64 |
| 3,835,333 | 9/1974 | Balan ........................................ 307/64 |
| 3,949,238 | 4/1976 | Brookes .................................... 307/64 |
| 4,356,402 | 10/1982 | Morimoto et al. ....................... 307/19 |
| 4,659,942 | 4/1987 | Volp ......................................... 307/19 |
| 5,638,295 | 6/1997 | Lagree et al. ........................... 364/492 |

*Primary Examiner*—Albert W. Paladini
*Attorney, Agent, or Firm*—Lane R. Simmons

[57] ABSTRACT

A live AC mains power selector for a disk storage system having electrical redundancy comprises first and second AC mains, first, second and third power supplies, and switching means. The first and second power supplies are connected, respectively, to the first and second AC mains. The switching means is powered by the first AC main and connects the first AC main to the third (redundant) power supply in the event the first AC main is energized. The switching means automatically connects the second AC main to the third power supply in the event the first AC main is de-energized. In alternate embodiments, all three power supplies remain operational in the event of a failure of the first AC main. With the addition of a second switching means, all three power supplies remain operational in the event of a failure of either AC main. In yet further alternate embodiments, a live AC mains selector is included in a system having equal inputs and outputs.

20 Claims, 6 Drawing Sheets

5,917,253

LIVE AC MAINS POWER SELECTOR FOR REDUNDANT SYSTEMS

FIELD OF THE INVENTION

This invention relates in general to redundant electrical systems and, more particularly, to circuits for reducing the impact on a disk storage system in the event of a loss of a redundant AC main.

BACKGROUND OF THE INVENTION

In high-reliability computer disk storage systems, there is a desire to have redundancy in all the physical parts which make up a subsystem to reduce the potential for loss of data and down time upon failure of a part. The need for redundancy is especially applicable to the power supply for the storage system and to the AC main which provides the voltage to the power supply. For example, in conventional system configurations, redundancy has meant the use of at least a second power supply, although the system is capable of operating with only one power supply. As such, in the event of a loss of one of the power supplies, the other will continue to be operational. Moreover, redundancy is further assured by powering these supplies from separate AC mains. Accordingly, in the event of a circuit breaker failure or other loss of an AC main to one of the power supplies, the other AC main will continue to supply voltages to the system through the other power supply. It should be noted that where two AC mains exist, it is not uncommon that they originate from different sources and, therefore, carry differing phases. As such, both mains cannot generally be connected to a same power supply.

As these redundant systems increase in size and capacity, so does the demand for the DC supply current. Accordingly, certain systems require at least two power supplies, rather than a single supply, for supplying DC power to the system. In such systems, redundancy is accomplished by providing at least three power supplies, with the third being the redundant supply. However, in the event a system's redundancy relies on two supplies to be functional, the user is faced with a dilemma. Namely, although it is not uncommon for two separate AC mains to be available for redundancy as discussed, it is uncommon to have a third AC main available for use with a third power supply. As such, requiring a third AC main may cause customer dissatisfaction as well as require an additional unplanned expense. Furthermore, where only two AC mains are available, a redundant system having three power supplies causes customer confusion because the customer is forced to "guess" about which AC main won't fail and which power supply won't fail, in order to connect the same together for implementing the best redundancy technique. And, because of the potential phase problem between the mains (depending on customer configuration and AC main sources), only one AC main (rather than both) can be connected to the third power supply.

Accordingly, an object of the present invention is to reduce the impact upon an electrical system in the event of a loss of a redundant AC main, not only for systems having equal inputs and outputs, but also for where the number of AC main outputs is mismatched against the number of power supply inputs.

SUMMARY OF INVENTION

According to principles of the present invention in a preferred embodiment, a live AC mains power selector for an electrically redundant disk storage system comprises first and second AC mains, first, second and third power supplies, and relay means. The first and second power supplies are connected, respectively, to the first and second AC mains. The relay means is powered by the first AC main and connects the first AC main to the third (redundant) power supply in the event the first AC main is energized. The relay means automatically connects the second AC main to the third power supply in the event the first AC main is de-energized.

This invention allows a redundant system requiring two power supplies to have a third power supply available for redundancy, yet does not mandate three separate AC mains and does not require a user to guess which AC main should be connected to the third power supply. Moreover, in the event of a loss of an AC main, the negative impact to the redundant system is reduced because the third power supply and at least one of the other power supplies will always be connected to an energized AC main, regardless of which AC main may fail.

In alternate embodiments, all three power supplies remain operational in the event of a failure of the first AC main. Moreover, with the addition of a second relay, all three power supplies remain operational in the event of a failure of either AC main.

According to further principles in yet other alternate embodiments, the relay means provides improved reliability in a system having equal inputs and outputs. In addition, two relay means provide even further reliability by automatically connecting a live AC main output with both system inputs in the event either one of the AC mains is de-energized.

Other objects, advantages, and capabilities of the present invention will become more apparent as the description proceeds.

DETAILED DESCRIPTION OF THE INVENTION

Figure 1:
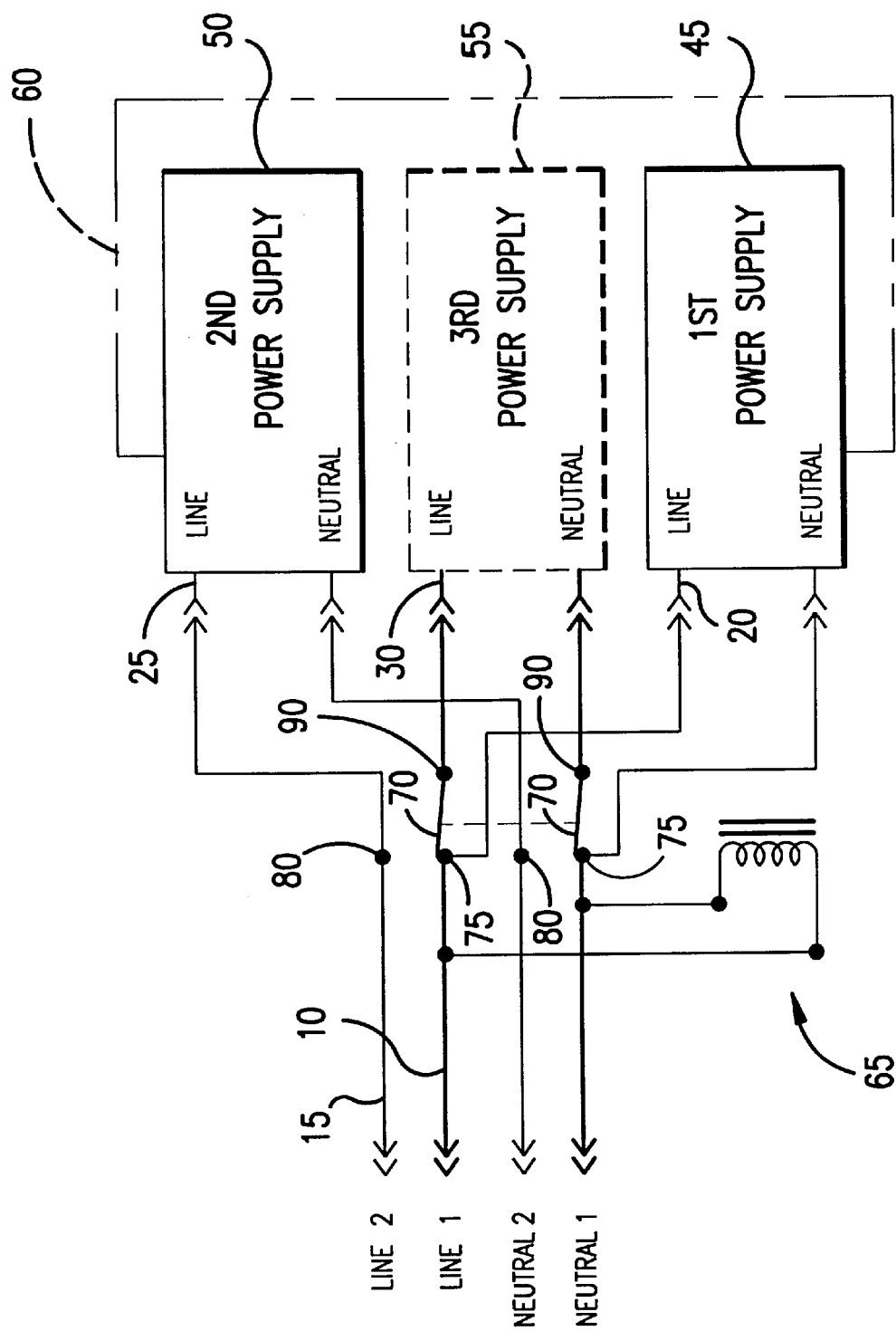
FIG. 1 is a schematic block diagram of the present invention live AC main selector for automatically selecting a live AC main in the event of a failure of a redundant AC main for a system having mismatched inputs and outputs.
Figure 2:
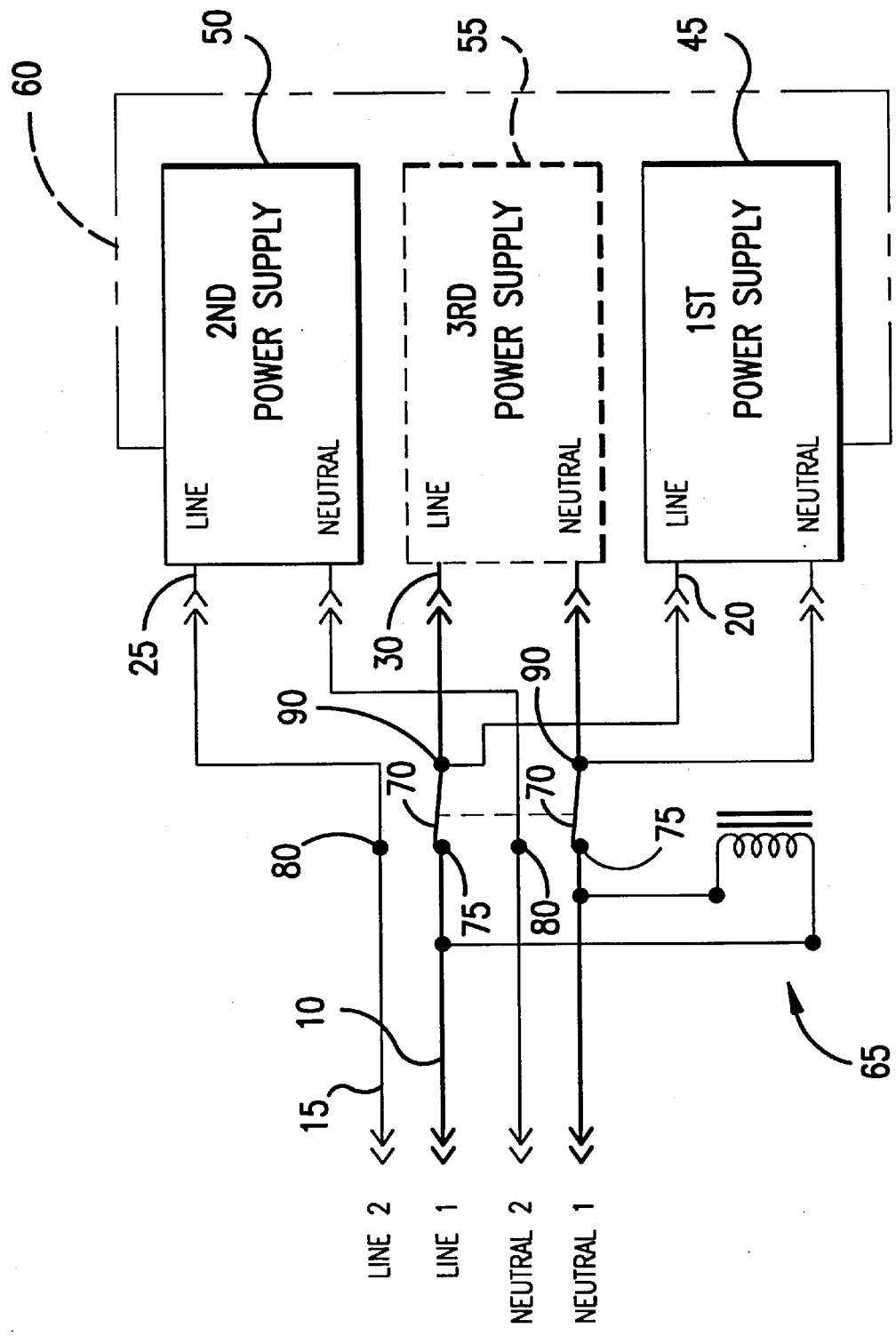
FIG. 2 is a schematic block diagram of an alternate embodiment of FIG. 1.
Figure 3:
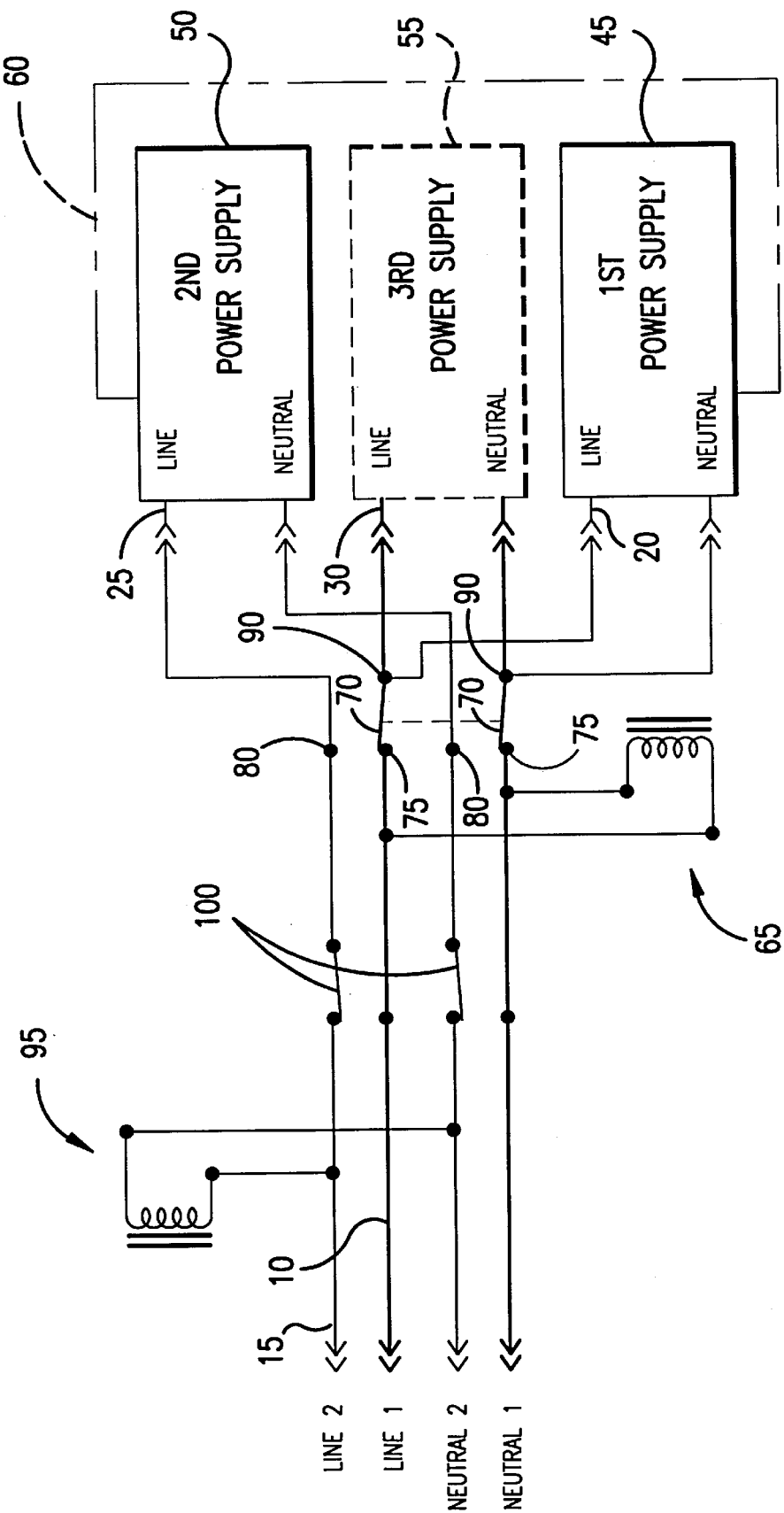
FIG. 3 is a schematic block diagram of an alternate embodiment of FIG. 1 having two relay means.
Figure 4:
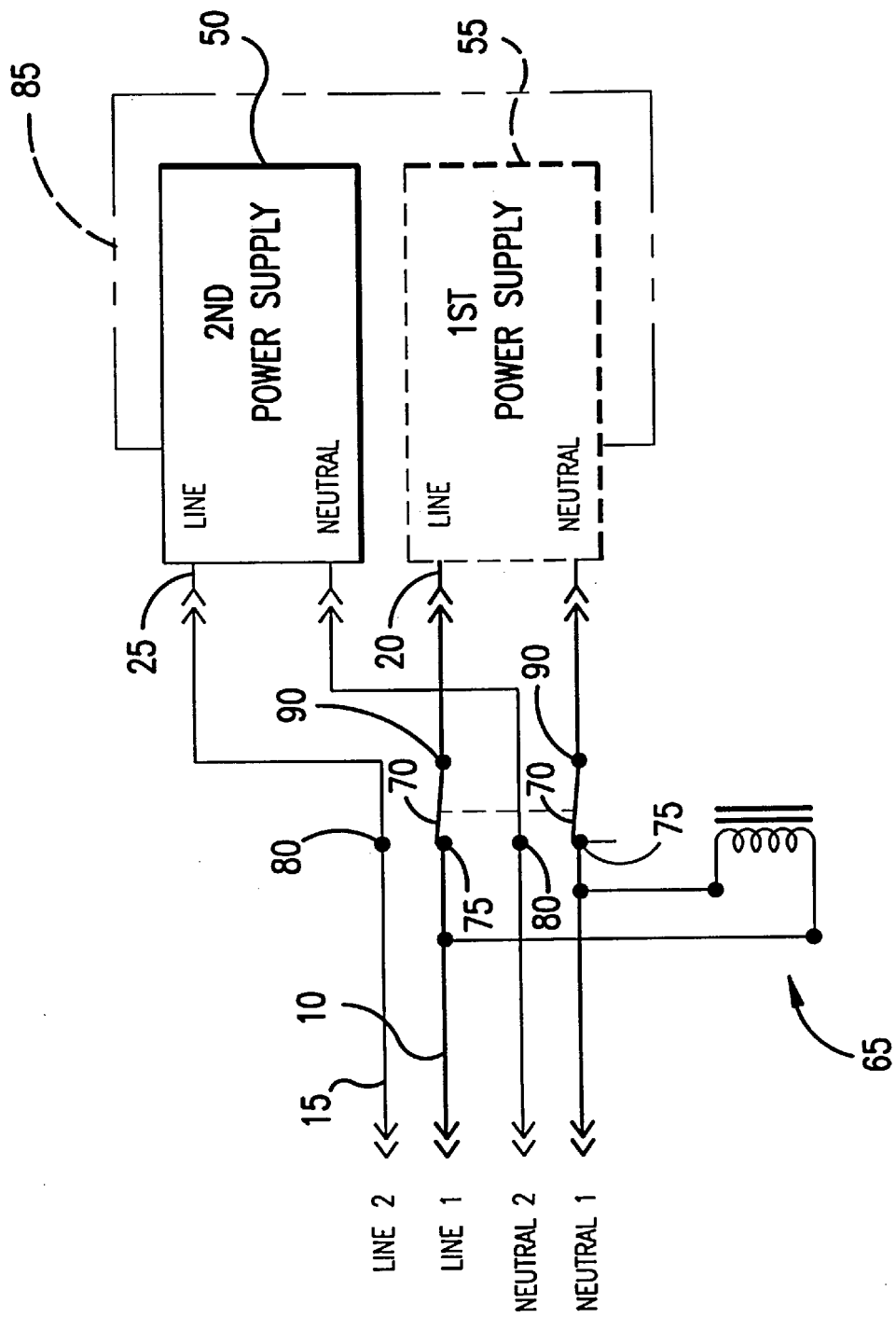
FIG. 4 is a schematic block diagram of an alternate embodiment for a system having equal inputs and outputs.
Figure 5:
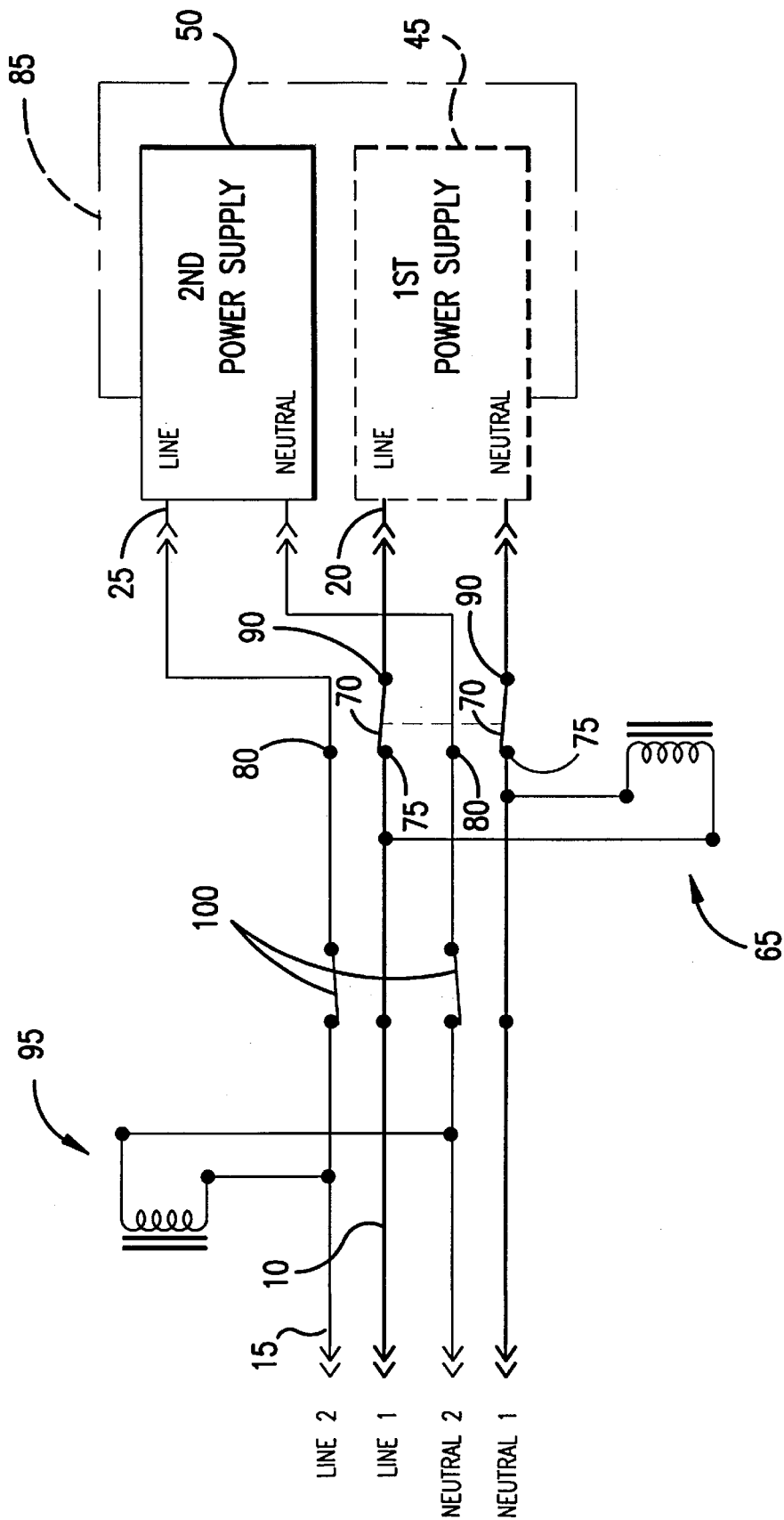
FIG. 5 is a schematic block diagram of an alternate embodiment of FIG. 4 having two relay means.

FIG. 1 is a schematic block diagram of the present invention live AC mains selector for a system 60 having mismatched inputs and outputs (i.e., three power supply inputs 20, 25, 30 vs. two AC main outputs 10, 15). Although the invention will be discussed in the context of a disk storage system having redundant power supplies 45, 50, 55, and redundant AC mains 10 and 15, it is obvious that the invention is equally applicable to other electrical systems, subsystems, redundant systems, transfer circuits, receiving circuits, energy sources, or the like. Furthermore, the discussion of FIGS. 1–3 is focused on a system which requires at least two power supplies 45, 50, for providing the necessary DC current to the system, and whereby a third power supply 55 is configured as a redundant supply in the event of a failure of one of the other two supplies 45, 50. However, other n-way configurations of redundancy are similarly applicable to the principles of the present invention. For example, FIGS. 4 and 5 depict the invention in connection with a system having two AC main outputs and two power supply inputs. Moreover, in each of the Figures, the inputs and outputs are arbitrarily designated as first, second, third, etc., as examples only.

In the redundant system of FIG. 1, first and second power supplies 45 and 50 provide the necessary DC current to disk storage system 60 (or other electrical system). The two AC mains 10 and 15 are feed circuits which provide voltage to the power supplies. First AC main 10 is tied to first power supply 45, and second AC main 15 is tied to second power supply 50. Both AC mains are not tied to a single power supply to avoid potential phase problems therebetween, since each main may originate from a different provider. Third power supply 55 is the redundant supply and, in the Figure, is also tied to first AC main 10 via switches 70. First and second supplies 45 and 50 are necessary for system operations, and third power supply 55 is a backup supply in the event either power supply 45 or 50 becomes inoperational.

Since there are only two AC mains 10 and 15, and yet there are three power supplies 45, 50 and 55, the problem resolved by the present invention is: which of the two AC mains should the redundant (third) power supply 55 be connected to? The answer, under principles of the present invention, is it does not matter. Namely, switching apparatus 65 provides a means for automatically selecting a live AC main in the event one AC main fails. Specifically, in the example shown, switching apparatus 65 is connected to first AC main 10. As such, when first AC main 10 is energized, switches 70 are pulled closed (into contact with terminals 75) by switching apparatus 65, thereby allowing third power supply 55 to be connected to first AC main 10. Thus, when both AC mains are energized, all three power supplies receive voltage for system 60.

Figure 6:
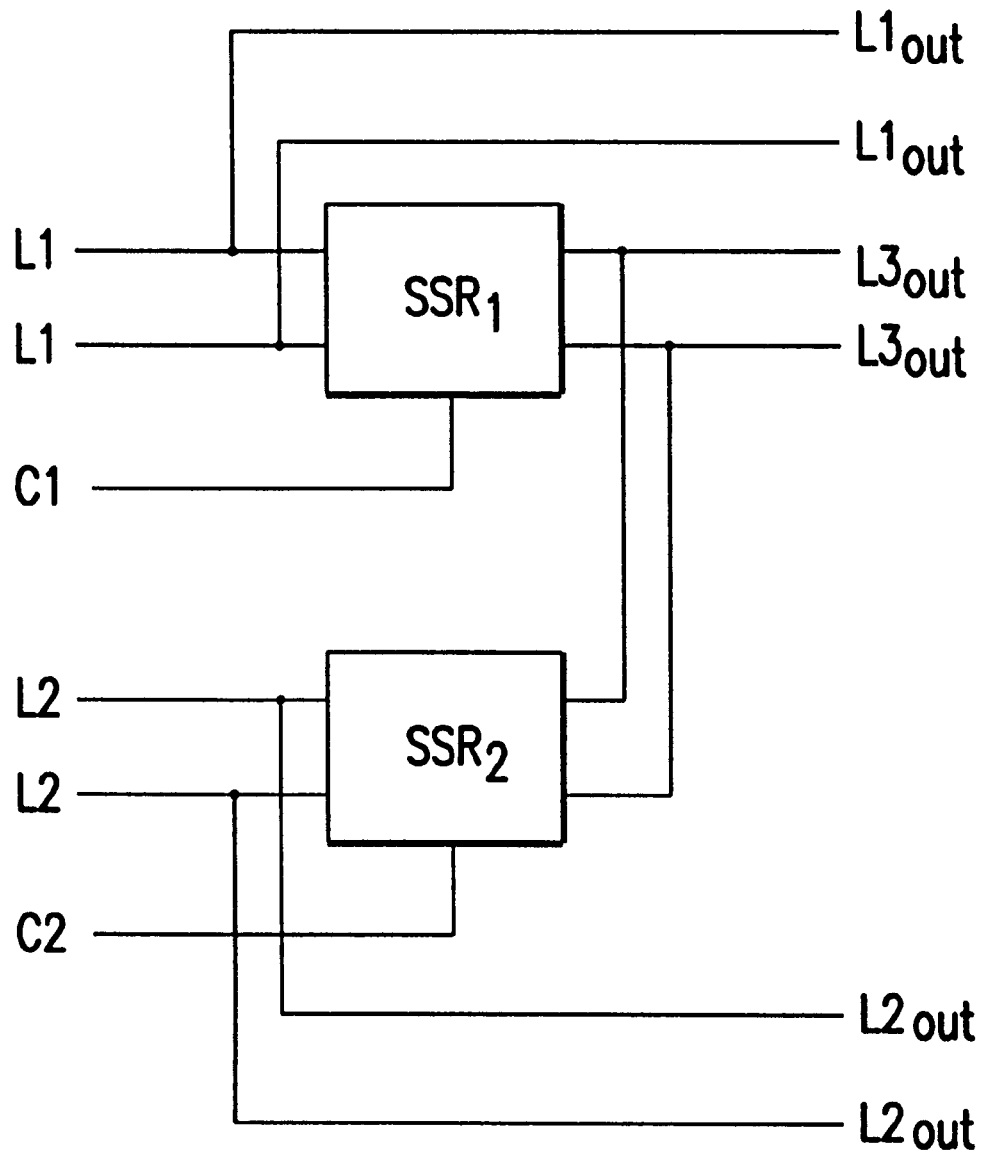

Switching apparatus 65 is any conventional relay in the art, such as an electro-mechanical double pole double throw switch, or it may be formed from solid state circuitry as obvious to those of ordinary skill in the art. FIG. 6 depicts solid state circuit relays $SSR_1$ and $SSR_2$ incorporated into the present invention. FIG. 6 correlates to FIG. 1 except that FIG. 6 incorporates solid state circuit relays $SSR_1$ and $SSR_2$ to automate the switching rather than an electro mechanical relay 65 as suggested in FIG. 1. Relays $SSR_1$ and $SSR_2$ are conventional relays in the art and may comprise one or more sub relay circuits (where a relay is defined, simply, as a device for rerouting current and voltage). Lines L1 and L2 represent AC mains, control lines C1 and C2 represent DC lines for controlling the switching, and $L1_{OUT}$, $L2_{OUT}$ and $L3_{OUT}$ represent the AC output lines. C1 and C2 are DC lines derived from AC lines L1 and L2. If AC voltage is present on L1, then relay $SSR_1$ is closed by control C1 being asserted such that $L1_{OUT}$ and $L3_{OUT}$ are fed by L1. At the same time, $SSR_2$ is open by control C2 not being asserted such that $L2_{OUT}$ is only fed by L2. In the event L1 fails, C1 is de-asserted thereby opening $SSR_1$, and C2 is asserted thereby closing $SSR_2$ such that $L2_{OUT}$ and $L3_{OUT}$ are now fed by L2. In either case, the switching speed of relay 65 must be less than about one signal cycle of the AC main (i.e., about 20 ms), so that continuity of the signal is maintained for the power supply after switching AC mains.

In the event first AC main 10 is de-energized (due to circuit breaker failure or other loss of AC for whatever reason), relay 65 is also de-energized, thereby causing switches 70 to automatically open and connect with second AC main 15 at terminals 80. Accordingly, first AC main 10 and first power supply 45 are inoperative with respect to system 60, but second AC main 15 and second and third power supplies 50 and 55 remain energized for supplying power to the system.

In the event second AC main 15 is de-energized, second power supply 50 is also lost. However, first AC main continues to provide voltage to first power supply 45, and relay 65 remains energized through first AC main 10 and continues to provide voltage to third power supply 55 through switches 70. To this regard, a novel aspect of this circuit is its ability to always supply AC current to the odd (third) power supply 55, regardless of a loss of either of the redundant AC mains 10 or 15.

FIG. 2 is a schematic block diagram of an alternate embodiment of FIG. 1. Like components retain like references throughout all the Figures. Output 20 of first AC main 10 is connected at terminals 90 of switch 70 rather than at terminals 75. As such, when AC main 10 is de-energized, this configuration provides power from second AC main 15 via relay 65 and switches 70 to all three power supplies 45, 50, 55, rather than just two power supplies. Thus, improved redundancy for system 60 is provided at the power supply level in the event first AC main 10 fails.

FIG. 3 depicts yet another embodiment providing even further redundancy improvement. Specifically, second relay 95 is connected to second AC main 15 for providing a closed circuit to second power supply 50 through switches 100 when second AC main 15 is energized. Second relay 95 automatically breaks the circuit in the event second AC main 15 is de-energized, and immediately closes the circuit between first AC main 10 and second power supply 50 via switches 100. Thus, in this embodiment, no matter which AC main fails, all three power supplies remain powered for system 60 via the other live redundant main.

Referring now to FIG. 4, a schematic block diagram is shown of the present invention in a system 85 having equal inputs 20, 25, and equal outputs 10, 15. This embodiment is applicable, for example, to an electrical system 85 that only requires one power supply, either 45 or 50, for DC current. The second supply is the redundant supply. In the event first AC main 10 fails, relay 65 is de-energized thereby causing switches 70 to connect to second AC main 15 at terminals 80 for providing continued voltage to both power supplies 45 and 50. As such, although AC main 10 fails, system 85 still retains redundancy of operational power supplies 45 and 50.

FIG. 5 depicts an alternate embodiment of FIG. 4 employing a second relay 95. This configuration allows system 85 to retain energized both power supplies 45 and 50 in the event of failure of either AC main 10 or 15. The remaining live AC main is automatically selected by the respective relay for providing improved system reliability.

Finally, what has been described above are the preferred embodiments for a live AC main power selector for redundant systems. It will be obvious to one of ordinary skill in the art that the present invention is easily implemented utilizing any of a variety of components existing in the art. Moreover, while the present invention has been described by reference to specific embodiments, it will be apparent that other alternative embodiments and methods of implementation or modification may be employed without departing from the true spirit and scope of the invention.

What is claimed is:

1. A circuit comprising:
    (a) first and second energized AC feed circuits;
    (b) first and second receiving circuits connected to and energized by, respectively, the first and second feed circuits; and, (c) first switching apparatus which automatically connects the second feed circuit to the first receiving circuit in the event the first feed circuit is de-energized, whereby both the first and second receiving circuits are energized by the second feed circuit without any substantial loss in transfer of line voltage.

2. The circuit of claim 1 wherein the first and second feed circuits are AC mains.

3. The circuit of claim 1 wherein the first switching apparatus automatically connects the second feed circuit to the first receiving circuit in a time frame of less than about one signal cycle of the first feed circuit.

4. The circuit of claim 1 wherein the first and second receiving circuits are power supplies.

5. The circuit of claim 4 wherein the first and second power supplies are connected to a disk storage system.

6. The circuit of claim 1 wherein the first switching apparatus is a relay energized by the first feed circuit.

7. The circuit of claim 6 wherein the relay is selected from an electro-mechanical relay and a solid state circuit relay.

8. The circuit of claim 1 further including at least a third receiving circuit connected to the first feed circuit.

9. The circuit of claim 8 wherein the first switching apparatus further automatically connects the second feed circuit to the at least third receiving circuit without any substantial loss in transfer of line voltage in the event the first feed circuit is de-energized.

10. The circuit of claim 1 further including second switching apparatus which connects the first feed circuit to the second receiving circuit in the event the second feed circuit is de-energized, whereby both the first and second receiving circuits are energized by the first feed circuit without any substantial loss in transfer of line voltage.

11. The circuit of claim 10 wherein the second switching apparatus is a relay energized by the feed circuit.

12. A redundant electrical system comprising:
(a) first and second energized AC energy sources;
(b) first and second energy transfer circuits connected to and energized by, respectively, the first and second energy sources; and,
(c) a first relay connected to and energized by the first energy source for automatically disconnecting the first energy source from the first transfer circuit and automatically connecting the second energy source to the first transfer circuit in the event the first energy source is de-energized, whereby both the first and second transfer circuits are energized by the second energy source without any substantial loss in transfer of line voltage.

13. The circuit of claim 12 wherein the first relay automatically connects the second energy source to the first energy transfer circuit in a time frame of less than about one signal cycle of the first energy source.

14. The redundant electrical system of claim 12 further including a second relay connected to and energized by the second energy source for enabling the second energy transfer circuit to be energized by the second energy source, and wherein the second relay automatically connects the first energy source to the second energy transfer circuit in the event the second energy source is de-energized, whereby both the first and second energy transfer circuits are energized by the first energy source.

15. The redundant electrical system of claim 12 wherein the first and second energy transfer circuits are power supplies.

16. The redundant electrical system of claim 12 wherein the relay means is selected from an electro-mechanical relay and a solid state circuit relay.

17. The redundant electrical system of claim 12 further including at least a third energy transfer circuit connected to the first energy source.

18. The redundant electrical system of claim 17 wherein the first relay further automatically connects the at least third energy transfer circuit to the second energy source in the event the first energy source is de-energized without any substantial loss in transfer of line voltage.

19. A live AC mains power selector for a redundant system comprising:
(a) first and second energized AC mains;
(b) first, second and third power supplies, the first and second power supplies being connected to and energized by, respectively, the first and second AC mains; and,
(c) relay means connected to and energized by the first energized AC main for automatically connecting the first AC main to the third power supply while the first AC main is energized and, in the event the first AC main is de-energized, for automatically disconnecting the third power supply from the first AC main and automatically connecting the second AC main to the third power supply, whereby both the second and third power supplies are energized by the second AC main without any substantial loss in transfer of line voltage.

20. The power selector of claim 19 wherein the relay means automatically connects the third power supply to the second AC main in a time frame of less than about one signal cycle of the first AC main.

* * * * *